R. Townsend,

Rein Supporter.

No. 111,279. Patented Jan. 24, 1871.

WITNESSES
J. Scheitlin
Edward H. Knight

Ross Townsend
By Knight Bros
Attorneys

N. PETERS, PHOTO-LITHOGRAPHER, WASHINGTON, D.C.

UNITED STATES PATENT OFFICE.

ROSS TOWNSEND, OF LIBERTY TOWNSHIP, UNION COUNTY, OHIO.

IMPROVEMENT IN REIN-SUPPORTERS.

Specification forming part of Letters Patent No. 111,279, dated January 24, 1871.

*To all whom it may concern:*

Be it known that I, ROSS TOWNSEND, of Liberty township, in the county of Union and State of Ohio, have invented a new and useful Rein-Supporter, of which the following is a specification.

The invention consists of a branching rod supported upon the back of the horse, so as to hold the reins beyond the reach of the animal's tail.

It further consists in the mode of attaching the said rein-supporting device.

Figure 1:
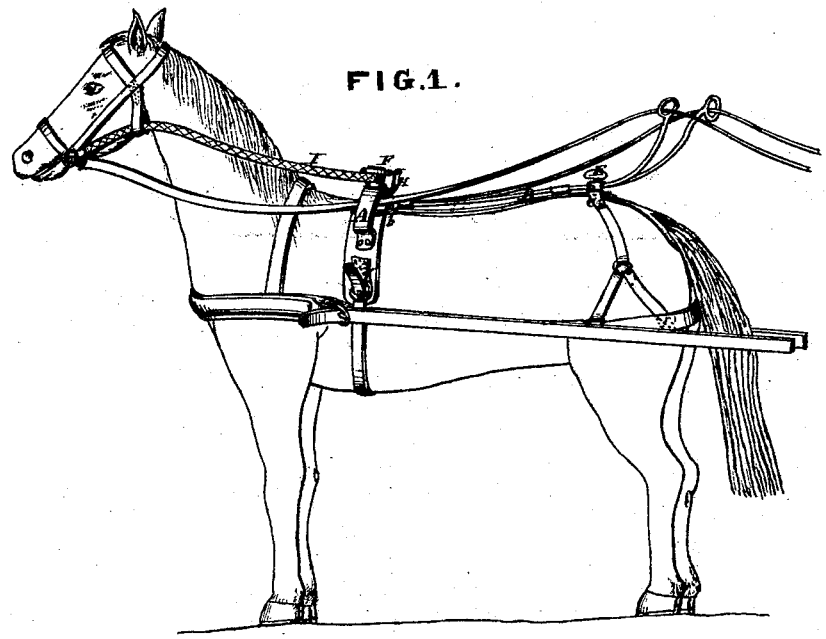
Figure 3:
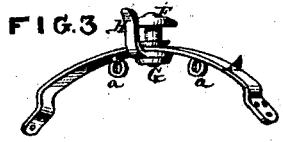
Figure 4:
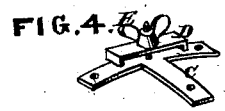
Figure 2:
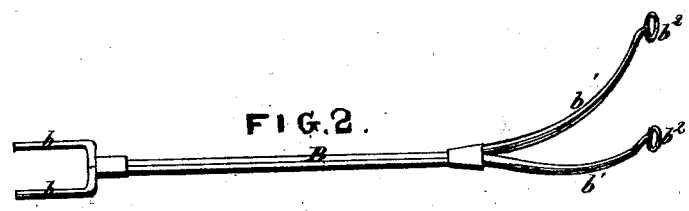

In the accompanying drawings, Figure 1 is a side elevation of the device in position. Fig. 2 is a view of the rein-supporter detached. Fig. 3 is a view of the tree and bearing-rein holder. Fig. 4 is a view of the clamp on the back-band, by which the supporter is held in position.

A is a gig-tree or a bridge-piece of a saddle-pad, having beneath it two staples, $a\ a$, for the reception of the arms $b\ b$ of the rod B, which rests upon the harness over the rump of the horse and has two branches, $b'\ b'$, having loops $b^2\ b^2$, through which the driving-reins pass. This disposition of the reins holds them out of the reach of the horse's tail. The rear portion of the rod rests upon the T-plate C, which is riveted upon the back and hip straps at their intersection.

D is a clamp-plate, which is fastened down upon the rod B by means of the thumb-screw E. The flat rod B is of metal, and is flexible. It has such an upward curve at the rear portion that the rein-loops $b^2$ may be made higher or lower by simply slipping the rod backward or drawing it forward and then fastening it by the clamp E. The branching portion $b\ b$ prevents the rod from tipping over sidewise under the weight of the rein. The piece B is preferably made of spring brass wire or steel spring-plate.

F is a spool on the pillar, which fastens below the tree at G and serves to hold the bearing-rein, being a substitute for the usual check-hook. The spool F turns freely on its spindle as the bearing-rein is pulled one way or the other by the motions of the horse's head. The rein is held in the channel or groove around the spool, assisted by the spring-piece H, which holds it in position. As the spool rotates freely the horse is more readily guided.

The bearing-rein I is elastic, being made of rubber webbing, so as to yield to the pulling on the bit, relieving the strain on the mouth. The spindle of the bearing-rein holder F may be a fixture, or it may be a means of clamping the rod B beneath the tree A.

The rein-holder may be detached and laid away at seasons of the year when it is not required.

What I claim as new is—

The rein-supporter herein described, consisting of a curved branching spring or flexible rod, B $b\ b'$, constructed with looped or hooked ends $b^2$, when said rod is attached by the clamp D E, constructed, as represented, so that the rod B $b\ b'$ may be adjusted or removed at will, in the manner specified.

ROSS TOWNSEND.

Witnesses:
 JOSEPH A. SHARP,
 H. D. GOWEY.